(12) United States Patent
Kobata

(10) Patent No.: US 6,943,695 B2
(45) Date of Patent: Sep. 13, 2005

(54) SEAT LOAD MEASURING APPARATUS

(75) Inventor: Toshihiko Kobata, Ohmihachiman (JP)

(73) Assignee: Takata Corporation, Tokyo (JP)

( * ) Notice: Subject to any disclaimer, the term of this patent is extended or adjusted under 35 U.S.C. 154(b) by 14 days.

(21) Appl. No.: 10/793,189

(22) Filed: Mar. 5, 2004

(65) Prior Publication Data

US 2004/0231435 A1 Nov. 25, 2004

(30) Foreign Application Priority Data

Apr. 18, 2003 (JP) ........................................ 2003-113991

(51) Int. Cl.[7] .............................................. G08B 21/00
(52) U.S. Cl. ..................... 340/667; 340/666; 177/144; 177/184; 73/862.381; 297/334.1
(58) Field of Search ................... 340/666, 667; 324/207; 177/144, 136, 184; 73/862.381, 795

(56) References Cited

U.S. PATENT DOCUMENTS 6,244,660 B1 * 6/2001 Yoshimatsu .............. 297/344.1
6,520,023 B2 * 2/2003 Kimura ........................ 73/795
6,571,647 B1   6/2003 Aoki et al.
2004/0094337 A1 * 5/2004 Saito et al. ................. 177/184

FOREIGN PATENT DOCUMENTS

JP   2000-258234 A   9/2000
JP   2002-116081 A   4/2002

* cited by examiner

Primary Examiner—Jeffery Hofsass
(74) Attorney, Agent, or Firm—Foley & Lardner LLP

(57) ABSTRACT

A vehicle seat load measuring apparatus includes a base for bearing a load applied to the seat, an arm supported by the base for receiving the load, a load sensor supported by the arm for detecting the load, and a seat rail for guiding the seat in a longitudinal direction of the vehicle. The base is fixed to the seat rail so that an open face of the base faces in a downward direction. The arm is connected by a stopper pin inserted through holes in the base to a mounting bracket fixed to a vehicle body. The base bracket includes a load bearing portion and is attached to the base and fixed to the seat rail. The load bearing portion of the base bracket is configured to contact the stopper pin when a load exceeding a predetermined value is applied to the seat rail.

4 Claims, 10 Drawing Sheets

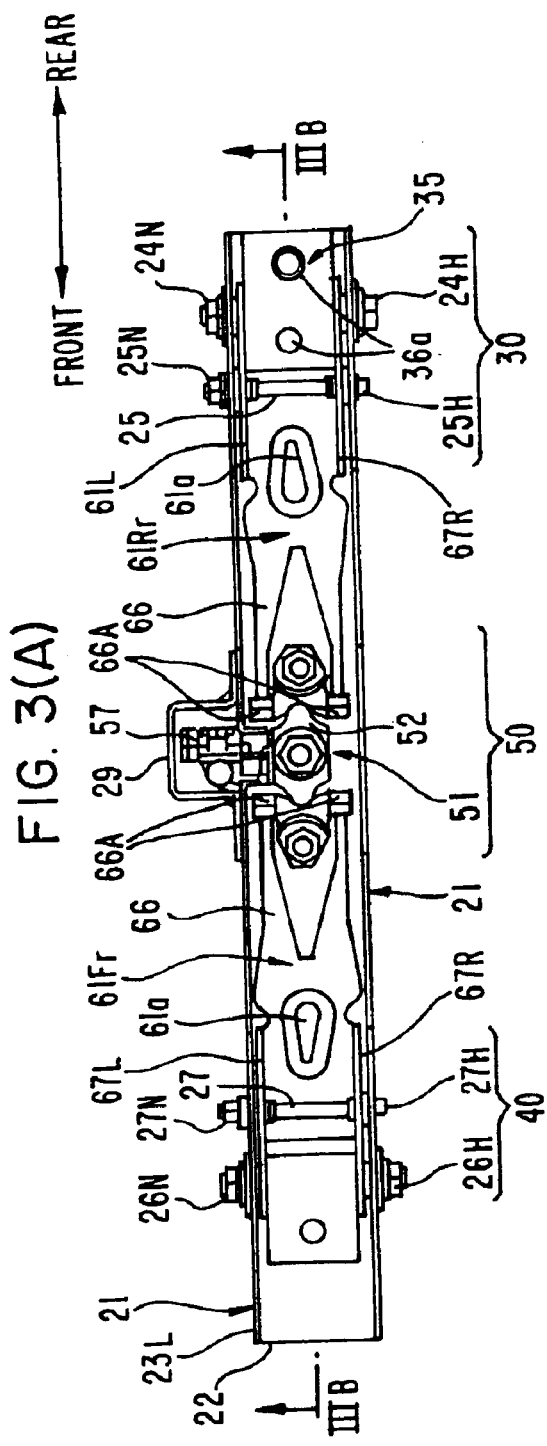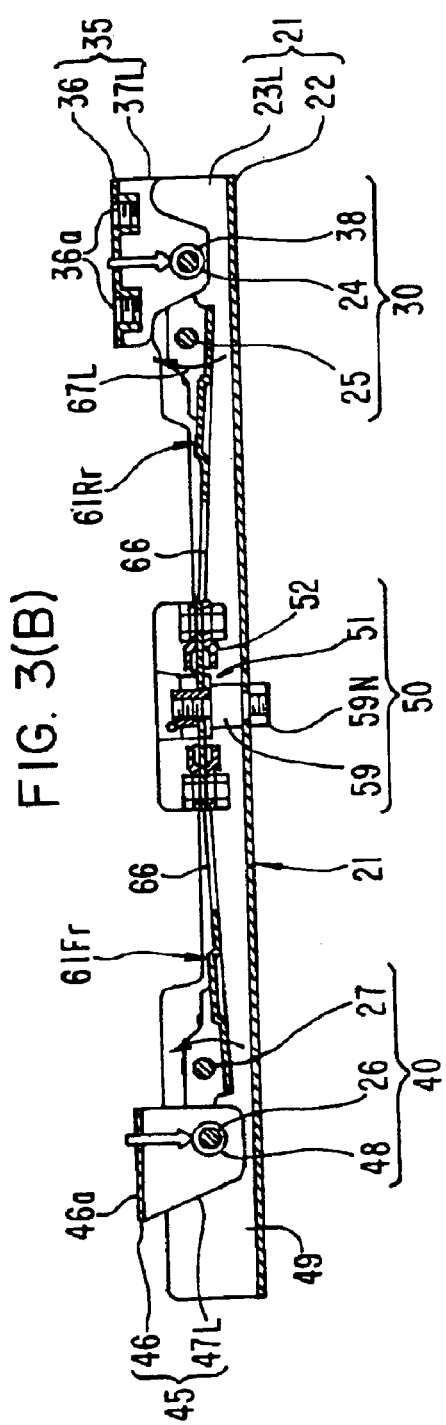
FIG. 3(A)
FIG. 3(B)

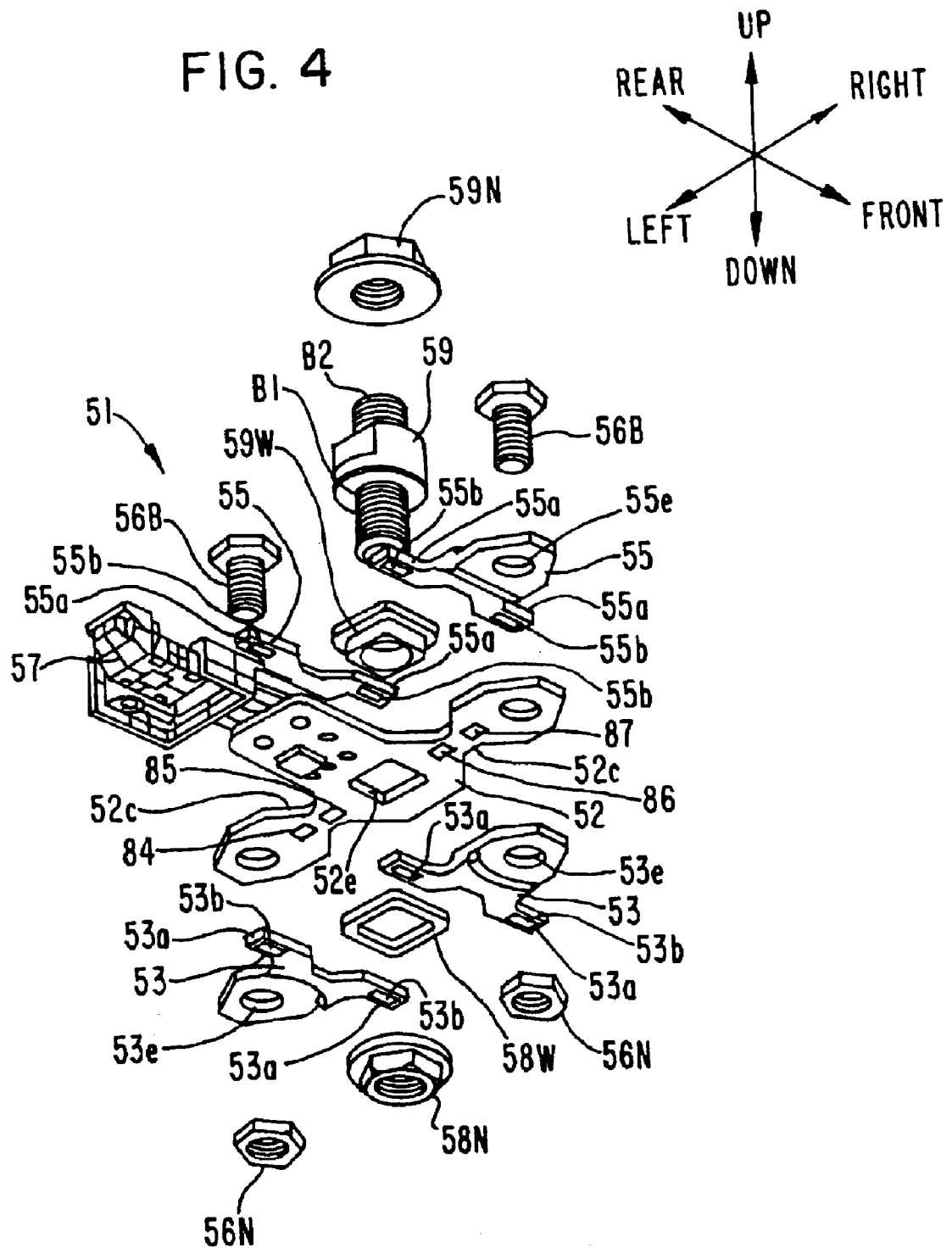

SEAT LOAD MEASURING APPARATUS

BACKGROUND

The present invention pertains to a technical field of a seat load measuring apparatus which is mounted beneath seat rails for guiding a seat of a vehicle, such as an automobile, to measure a load applied to the seat. Particularly, the present invention pertains to a technical field of a seat load measuring apparatus in which each seat rail is provided with a base bracket for mounting the seat rail to a base of the seat load measuring apparatus.

As a seat load measuring apparatus of this kind, there has been conventionally proposed a seat load measuring apparatus 104 for measuring a load applied to a vehicle seat 102 on which an occupant 101 is seated, the seat load measuring apparatus 104 being mounted beneath seat rails 103 for guiding the vehicle seat 102 as shown in FIGS. 10(A) through 10(C). The seat load measuring apparatus 104 comprises bases 105 each having an upward U-like cross section. The bases 105 are fixed to seat mounting portions 107 of a vehicle body via seat brackets 106 attached to the front and rear ends of the bases 105. Each seat rail 103 and each base 105 are connected to each other by pin brackets (hereinafter, sometimes referred to as "rail brackets") 108, as connecting brackets, having a downward U-like cross section. In this case, the seat rail 103 is strongly connected to the flat tops of the pin brackets 108 and bracket pins 109 are inserted through pin holes 108a, 108b formed in the left and right side plates of the pin bracket 108 and through pin holes 105a, 105b formed in the left and right side plates of the base 105, thereby connecting the seat rail 103 to the base 105 (for example, see Japanese Patent Unexamined Publication No. 2000-258234).

On the other hand, there has been proposed another seat load measuring apparatus comprising base members each having an U-like cross section as mentioned above, however, in which each base member is arranged such that the open side thereof faces to the floor side (downwardly). Unlike the case of the base which is arranged such that the open side faces upwardly as mentioned above, this structure eliminates the necessity of a cover for closing the U-like portion of the base member (for example, see Japanese Patent Unexamined Publication No. 2002-116081).

However, since the base 105 having the upward U-like cross section disclosed in the aforementioned Japanese Patent Unexamined Publication No. 2000-258234 is arranged such that the open side of the U-like portion faces upwardly, foreign matters such as dusts and liquid easily enter into the base 105 and are thus easily deposited in the base 105. Particularly, in case that a load sensor is arranged inside the base 105 in order to efficiently utilize the inner space of the base 105, when the occupant spills liquid such as juice, there is a possibility that the liquid is poured over electrical components of the load sensor inside the base 105. As the liquid is poured over electrical components, the durability of the electrical components is marred, and reliability of the load sensor is reduced.

To prevent the durability of the electric components from being marred due to wetting by liquid, as a conceivable way, a special component such as a cover is provided to the base 105, which has the disadvantage of increasing the number of components.

Since the pin brackets 108 are components belonging to the seat load measuring apparatus 104 not belonging to the seat rails, the pin brackets 108 are set in an assembly of the seat load measuring apparatus 104. In this assembly, the pin brackets 108 and the base 105 are integrally assembled by the bracket pins 109. Therefore, it is necessary to attach the pin brackets 108 to the seat rail 103. However, the bottom of the base 105 interferes with this work and makes this work difficult. That is, the seat load measuring apparatus 104 has relatively poor workability. Holes for allowing this attaching work may be formed in the base 105. This not only requires the step of processing the base but also lowers the strength of the base 105.

Further, large load is applied to the pin bracket 108 connecting the seat rail 103 and the base 105 of the seat load measuring apparatus 104. For example, during a vehicle collision, it is required to ensure enough strength of the pin bracket 108 for bearing this large load.

However, since the connecting structure between the seat rail 103 and the base 105 of the seat load measuring apparatus 104 disclosed in the aforementioned Japanese Patent Unexamined Publication No. 2000-258234 is achieved just by inserting the bracket pins 109 through the pin holes 105a, 105b simply formed in the left and right side walls of the base 105 having an upward U-like cross section and through the pin holes 108a, 108b simply formed in the left and right side walls of the pin brackets 108 having a downward U-like cross section, there is limitation on ensuring the sufficient strength of the pin bracket 108. That is, by enlarging the dimensions (for example, thickness and length from the pin holes 108a, 108b to the peripheral ends of the pin bracket 108) of forming parts 108c, 108d of the pin holes 108a, 108b of the pin bracket 108, it is possible to ensure some strength of the pin bracket 108. The enlargement of dimensions of the forming parts 108c, 108d of the pin holes 108a, 108b of the pin bracket 108 invites the limitation on layout and thus reduces the degree of freedom of installation.

Of course, it is possible to bear the large load during a vehicle collision even with the connecting structure by the pin bracket 108 disclosed in the aforementioned Japanese Patent Unexamined Publication No. 2000-258234. However, it is desirable to further sufficiently bear the large load without inviting the limitation on layout.

On the other hand, since the base member having a downward U-like cross section disclosed in the aforementioned Japanese Patent Unexamined Publication No. 2002-116081 is arranged such that the open side faces downwardly, the necessity of the cover for closing the U-like portion of the base member can be eliminated, thus resolving the problem of increasing the number of parts of the aforementioned Japanese Patent Unexamined Publication No. 2002-116081.

However, even the seat load measuring apparatus as disclosed in the Japanese Patent Unexamined Publication No. 2002-116081 has a problem of reducing the strength of the base member because holes for allowing this attaching work may be formed in the base member like the aforementioned Japanese Patent Unexamined Publication No. 2000-258234, thus reducing the strength of the base member.

Of course, it is possible to bear the large load during a vehicle collision even with the base member disclosed in the aforementioned Japanese Patent Unexamined Publication No. 2002-116081. However, it is desirable to further sufficiently bear the large load without inviting the limitation on layout.

Thus, there is a need for a seat load measuring apparatus being capable of preventing foreign matters from being deposited in the bases and capable of further sufficiently bearing the large load during a vehicle collision, in which though load sensors are supported by bases, the durability of electronic components is improved without any special component so as to improve the reliability of the load sensors, and the increase in number of components is inhibited to increase the degree of freedom of installation without inviting the limitation on layout.

SUMMARY

A seat load measuring apparatus according to an embodiment of the present invention includes a base for bearing the load applied to the vehicle seat, an arm supported by the base for receiving the load applied to the vehicle seat, a load sensor supported by the arm for detecting the load applied to the vehicle seat, and a seat rail for guiding the vehicle seat slidably in a longitudinal direction of the vehicle. The base is fixed to a lower side of the seat rail and is arranged so that an open face of the base faces in a downward direction. The arm is connected by a stopper pin inserted through holes formed in the base to a mounting bracket fixed to a vehicle body. A base bracket including a load bearing portion is attached to the base and is fixed to the lower side of the seat rail. The load bearing portion is configured to contact the stopper pin when a load exceeding a predetermined value is applied to the seat rail so that the load exceeding a predetermined value is borne by the load bearing portion.

The seat load measuring apparatus can also include a rail mounting member connected to the base bracket. The rail mounting member can be integral with the seat rail.

According to embodiments of the present invention, the load sensor is supported by the base of which the open side faces downwardly, and a load of the vehicle seat applied to the arm can be detected by the load sensor. The base is arranged such that its open side faces downwardly, thereby preventing foreign matters such as dusts or the like from entering and being deposited in the base. Especially, since liquid hardly enters into the base, electrical components of the load sensor inside the base can be prevented from getting wet even when an occupant spills the liquid such as juice. Therefore, the durability of the electrical components is improved and reliability of the load sensor is improved. Therefore, the load sensor can stably and highly precisely detect load over a long period of time.

Since no special component is required for protecting the electric components of the load sensor inside the base from getting wet with liquid, the increase in number of components can be inhibited and the work for mounting such a special component can be eliminated.

Since the base is arranged such that its open side faces downwardly, the bottom of the base positioned at the upper side is attached to the rail mounting member of the seat rail. Since the open side of the base faces downwardly, the work of attaching the base is conducted from the open side and is therefore easy. In addition, the necessity of special step of processing the base such as forming holes for allowing this attaching work can be eliminated. Moreover, no cover for closing the lower opening of the base is required, thereby reducing the cost and reducing the weight.

When a load is applied to the seat rail in the normal state, the load can be borne by the base via the stopper pin because the load is relatively small. On the other hand, when a relatively large load is applied to the seat rail during a vehicle collision or the like, the large load is borne by the load bearing portion of the base bracket via the stopper pin. In this manner, since even large load generated during a vehicle collision or the like can be borne by the load bearing portion of the base bracket, the large load is distributed and thus reduced so that a relatively small load is exerted on the base. Thus, the necessity of increasing the strength of the base can be eliminated, and, as a result, the necessity of increasing the dimensions of the base can be eliminated.

Therefore, the base can be configured compactly, thereby reducing the limitation on layout and increasing the degree of freedom of installation.

In addition, the base bracket can be made from a band-like plate so that the secure bearing of such an excessive load is achieved with simple structure.

When the seat load measuring apparatus includes the rail mounting member, the base bracket is connected to the seat rail via the rail mounting member, thereby facilitating the work of attaching the base to the seat rail and thus improving the workability.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 3(A) is a bottom plan view of the seat load measuring apparatus of FIG. 2 in an assembled state.

FIG. 3(B) is a sectional view taken along a line IIIB—IIIB of FIG. 3(A).

FIG. 4 is an exploded perspective view showing a sensor portion of the seat load measuring apparatus of FIG. 2.

DETAILED DESCRIPTION

In the entire description of the present invention, the forward, backward, leftward, rightward, upward, and downward directions correspond to the forward, backward, leftward, rightward, upward, and downward directions of a vehicle.

Figure 1:
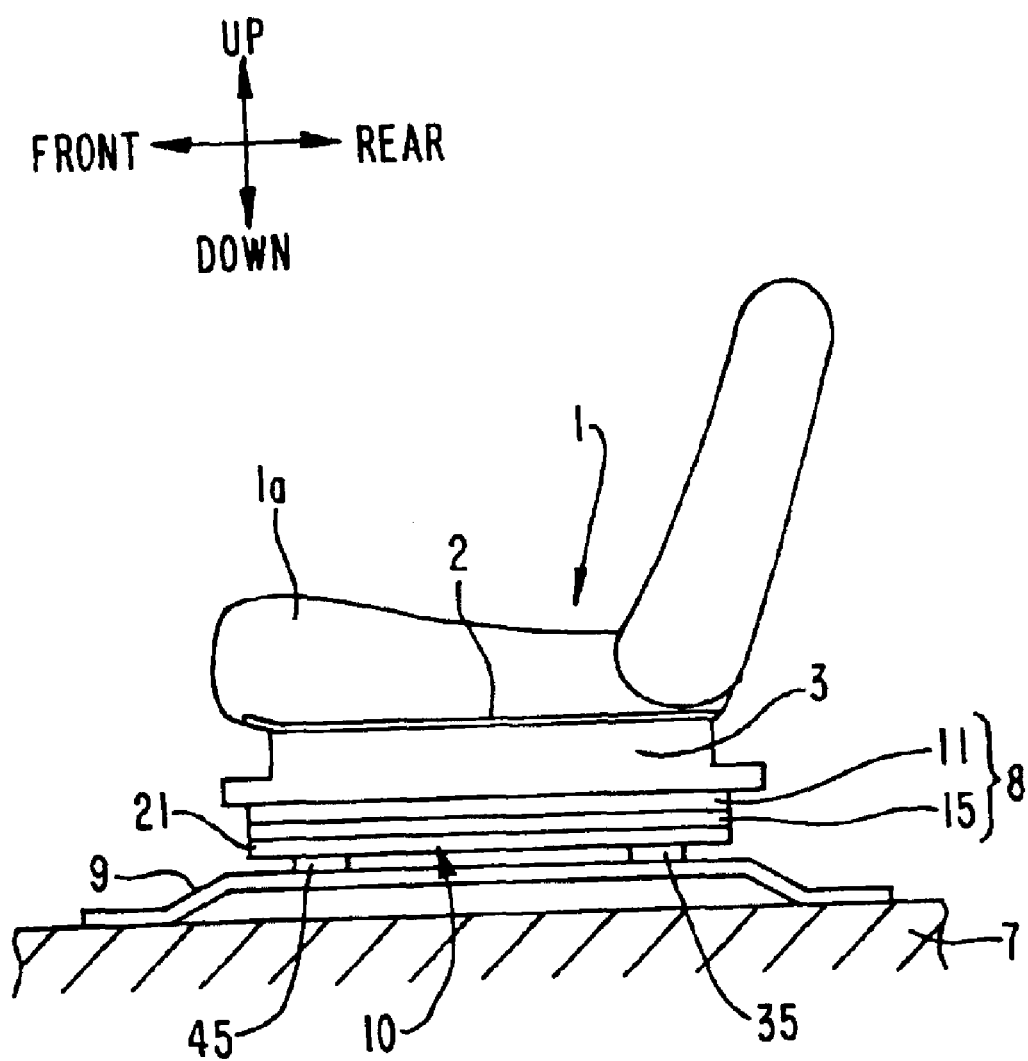
FIG. 1 is a side view showing a vehicle seat including a seat load measuring apparatus according to an embodiment of the present invention.

As shown in FIG. 1, a vehicle seat 1 has a seat cushion 1a on which an occupant can sit and a seat pan 2 made of a steel sheet, which is disposed beneath the seat cushion 1a to entirely cover the under surface of the seat cushion 1a. Under the seat pan 2, a pair of side frames 3 (only a left side frame is shown in FIG. 1) extend downwardly from the seat pan 2 and are spaced apart from each other at a predetermined distance in the lateral (left-to-right) direction of the vehicle. Each side frame 3 is disposed to extend in the longitudinal (front-to-rear) direction of the vehicle.

Disposed on the lower ends of the side frames 3 are seat rails 8 (only a left side seat rail is shown in FIG. 1). Each seat rail 8 is a combination of an upper rail 11, which is fixed to the lower end of the side frame 3, and a lower rail 15, which is arranged to be slidable relative to the upper rail 11 in the longitudinal direction of the vehicle. Therefore, the seat rails are provided for guiding the vehicle seat 1 slidably in the longitudinal direction of the vehicle.

Figure 8A:
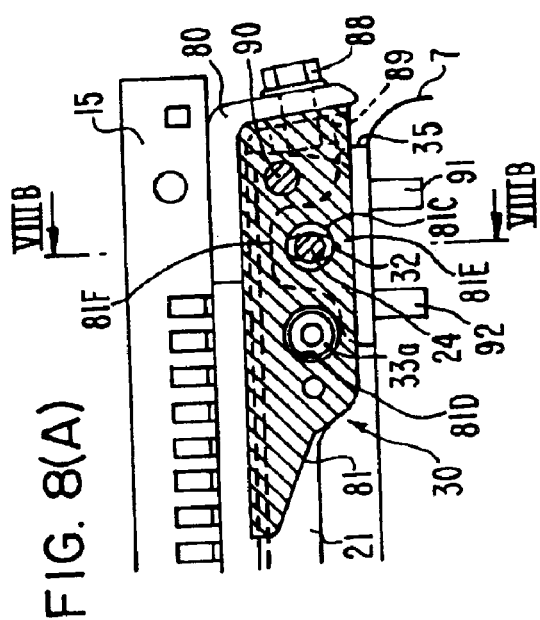
FIG. 8(A) is a view of a structure for connecting a seat rail and a base of an embodiment of a seat load measuring apparatus according to the present invention showing a state where a normal load is applied.
Figure 8B:
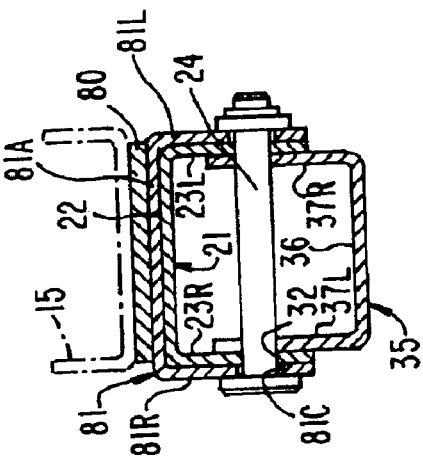
FIG. 8(B) is a sectional view taken along a line of VIIIB—VIIIB of FIG. 8(A).

As shown in FIGS. 8(A) and 8(B), each lower rail 15 has a rear rail mounting member 80, which is closely attached to the rear end of the bottom of the lower rail 15 and which has an L-like section in the lateral (right-to-left) direction of the vehicle. The rear rail mounting member 80 may be integrally formed with the lower rail 15 as a single member. Each lower rail 15 also has a front rail mounting member (not shown) formed in the same configuration as the rear rail mounting member 80 which is attached to the front end of the bottom of the lower rail 15 and which has an L-like section in the lateral (right-to-left) direction of the vehicle. The front rail mounting member and the rear rail mounting member are arranged to face in directions opposite to each other.

As shown in FIG. 1, disposed between a pair of left and right rear rail mounting members 80 and between a pair of left and right front rail mounting members (not shown) are a pair of left and right seat load measuring apparatuses 10 (only a left seat load measuring apparatus 10 is shown in FIG. 1). The seat load measuring apparatuses 10 are fixed to a vehicle floor 7 by respective front and rear mounting brackets 45, 35, each having an U-like cross section, via a pair of left and right seat brackets 9. The front and rear mounting brackets 45, 35 may be directly fixed to the vehicle floor 7. However, the seat brackets 9 achieve the stable support of the vehicle seat 1 to the vehicle body, thereby achieving further precise detection of the load of the vehicle seat 1 by load sensors 51, as will be described later, of the seat load measuring apparatuses 10. Therefore, it is preferable to use the seat brackets 9 as shown in FIG. 1.

Figure 2:
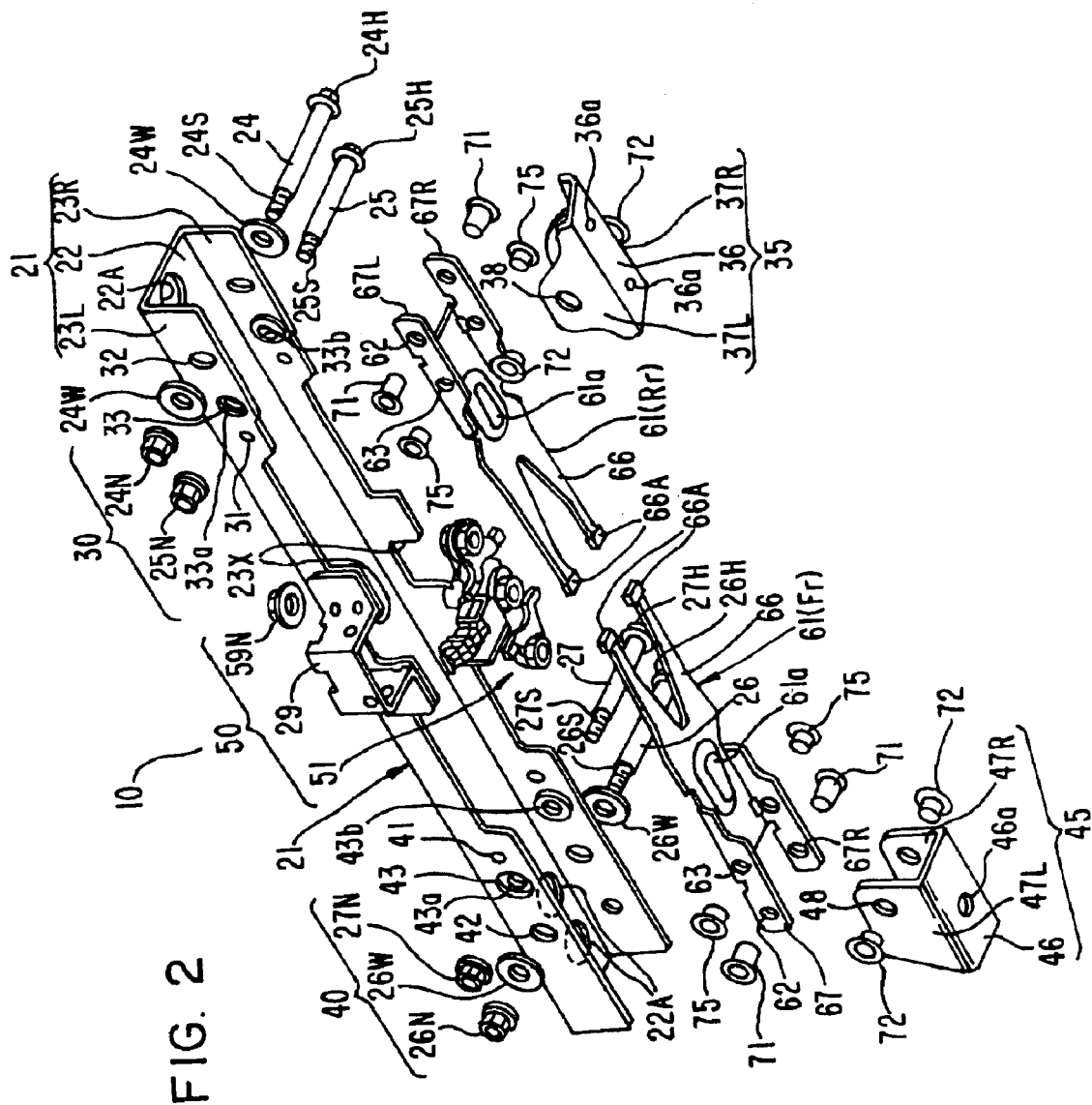
FIG. 2 is an exploded perspective view of an embodiment of a seat load measuring apparatus according to the present invention.

As shown in FIGS. 2, 3(A), and 3(B), the seat load measuring apparatus 10 comprises a base frame (corresponding to the base of the present invention) 21 which extends in the longitudinal direction of the vehicle. The base frame 21 is composed of a base bottom 22 and base side walls 23L, 23R such that the base frame 21 is formed to have a downward U-like cross section (to have an open bottom). The base frame 21 is provided near the front and rear ends thereof with mounting portions 40 and 30 relative to the lower rail 15. As shown in FIGS. 8(A) and 8(B), the base frame 21 is provided at the mounting portion 30 near the rear end thereof with a base bracket 81. The base bracket 81 is made from a band-like plate into a configuration having a bottom 81A and the left and right side walls 81L, 81R so as to have a downward U-like cross section (to have an open bottom). The base bracket 81 is also formed with a rear end wall 81B. In this case, the bottom 81A and the rear end wall 81B cooperate together to form an L-like shape in section in the longitudinal direction of the vehicle.

The base bracket 81 is fixed to the mounting portion 30 near the rear end of the base frame 21 by rivets 90 such that the respective inner surfaces of the bottom 81A and the left and right side walls 81L, 81R are in contact with the respective outer surfaces of the base bottom 22 and the left and right side walls 23L, 23R. The rear rail mounting member 80 having an L-like cross section is fixed to the lower rail 15. In a state that the respective inner surfaces of the rail mounting member 80 are in contact with the outer surfaces of the bottom 81A and the rear end wall 81B of the base bracket 81, the rear rail mounting member 80 is fixed to the rear end wall 81B of the base bracket 81 by a bolt 88 and a nut 89. In this manner, the lower rail 15 and the base frame 21 are fixedly connected to each other such that the base frame 21 is positioned near the seat rail 8, i.e., the opposite side from the vehicle body.

The base frame 21 is provided at the center in the longitudinal direction of the vehicle with the sensor portion 50. Description will be made as regard to the sensor portion 50. As shown in FIG. 1, the mounting portion 30 near the rear end of the base frame 21 is provided with elongated holes 32, pivot holes 33, and small apertures 31, which are formed in rear end portions of the left and right base side walls 23L, 23R, respectively, to correspond to those of the other base side wall 23R, 23L.

The elongate holes 32 are long in the vertical direction. As shown in FIGS. 2, 3(A), 3(B), and 7(A), a stopper bolt (corresponding to the stopper pin of the present invention) 24 is inserted through the elongated holes 32. The stopper bolt 24 is a pivot pin that pivotally supports a rear mounting bracket 35 and a Z arm 61Rr together and transmits a seat load to the Z arm 61Rr shown by a double-line arrow of FIG. 3(B). The stopper bolt 24 is provided at one end with a hexagon head 24H, at the other end with a threaded portion 24S, and at the middle with a smooth cylindrical surface. The stopper bolt 24 is inserted through the elongated holes 32 and is then fixed by a stopper nut 24N via a stopper washer 24W.

Figure 7A:
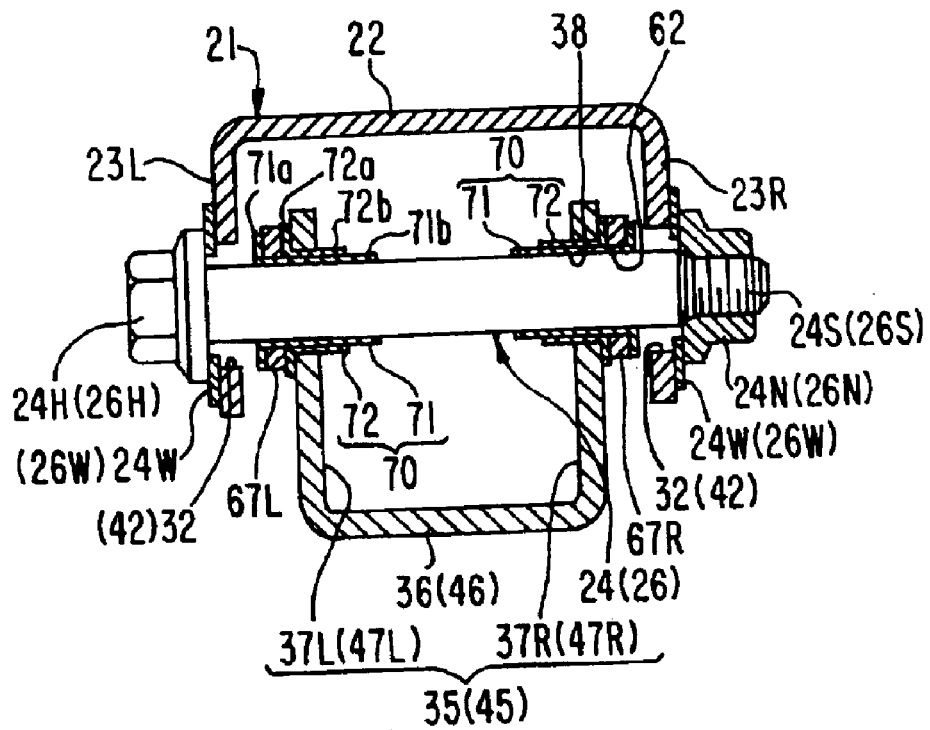
FIG. 7(A) is an enlarged sectional view showing a bolt mounting portion of the seat load measuring apparatus of FIG. 2 taken along an axis of a front stopper bolt.

As shown in FIGS. 7(A), 8(A), and 8(B), there are gaps between the outer periphery of the stopper bolt 24 and the inner peripheries of the elongate holes 32 in the assembled state so that the stopper bolt 24 is normally prevented from touching the inner peripheries of the elongated holes 32. In the normal state, when a relatively small load is applied to the vehicle seat 1 so that the base frame 21 is raised upwardly, the lower peripheries of the elongate holes 32 collide with the stopper bolt 24 so that the load is borne by the base side walls 23L, 23R of the base frame 21. In addition, accordingly, this load is transmitted directly from the base side walls 23L, 23R of the base frame 21 to the rear mounting bracket 35. In this case, the load does not act on a load sensor (sensor plate 52, as will be described later) 51. Also, when the base frame 21 is depressed because of forces applied to the seat belt, the upper peripheries of the elongated holes 32 collide with the stopper bolt so as to exhibit the same works.

Figure 7B:
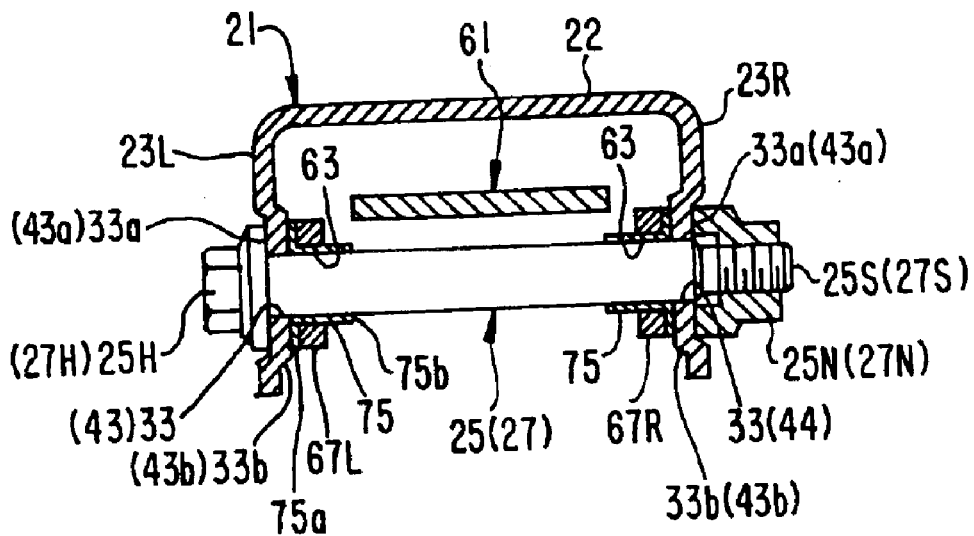
FIG. 7(B) is an enlarged sectional view showing a bolt mounting portion of the seat load measuring apparatus of FIG. 2 taken along an axis of a pivot bolt.

Though the base bracket 81 is not shown in FIGS. 7(A) and 7(B), the base bracket 81 is arranged such that the bottom 81A is on the bottom 22 of the base frame 21 and, at the position of the bolt 24, both side walls 81L, 81R are sandwiched between the base side walls 23L, 23R and the head 24H and the nut 24N of the bolt 24, respectively (in more detail, between the base side walls 23L, 23R and the washers 24W), and, at the position of a bolt 25, both side walls 81L, 81R are positioned outside.

As shown in FIG. 2, the pivot holes 33 are formed in the base side walls 23L, 23R at positions closer to the center than the positions of the elongated holes 32, respectively. Formed around the pivot holes 33 are counter bores 33a formed in outer surfaces of the base side walls 23L, 23R and convexities 33b formed in the inner surfaces of the base side walls 23L, 23R. Inserted into the pivot holes 33 is the pivot bolt (pivot pin) 25 as shown in FIGS. 2, 3(A), 3(B), and 7(B). The pivot bolt 25 is a pivot pin for supporting the Z arm 61Rr such that the Z arm 61Rr is pivotable relative to the base frame 21. When the seat load is applied to the Z arm 61Rr via the stopper bolt 24 shown by a double-line arrow of FIG. 3(B), the Z arm 61Rr pivots about the pivot bolt 25. The pivot bolt 25 is provided at one end with a hexagon head 25H, at the other end with a threaded portion 25S, and at the middle with a smooth cylindrical surface. The pivot bolt 25 is inserted through the pivot holes 33 and is then fixed by a pivot nut 25N.

The left and right side walls 81L, 81R of the base bracket 81 are each provided with a through hole 81C through which the stopper bolt 24 is inserted and with a through hole 81D through which the pivot bolt 25 is inserted. As shown in FIGS. 7(A), 8(A), and 8(B), the through holes 81C are formed to be coaxial with the elongated holes 32 in the state that the base bracket 81 is mounted on the base frame 21. On the other hand, the through holes 81C are formed such that the upper peripheries of the through holes 81C are somewhat upward from the upper peripheries of the elongated holes 32 and the lower peripheries of the through holes 81C are somewhat downward from the lower peripheries of the elongated holes 32 in the state that the through holes 81C are positioned coaxially with the elongated holes 32.

Figure 8C:
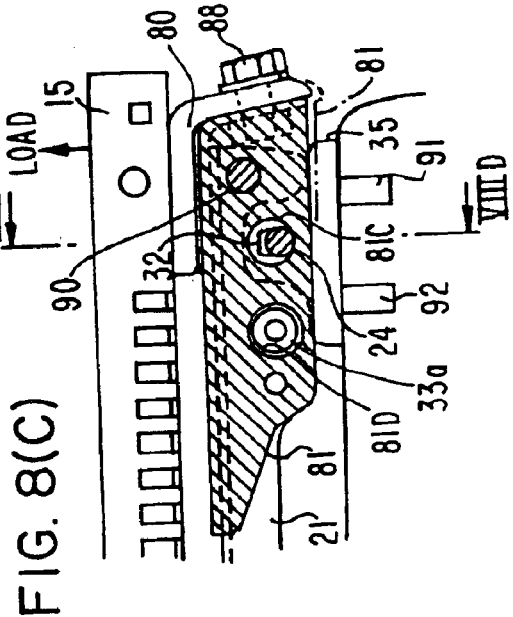
FIG. 8(C) is a view of the structure of FIG. 8(A) showing a state where a large load is applied.
Figure 8D:
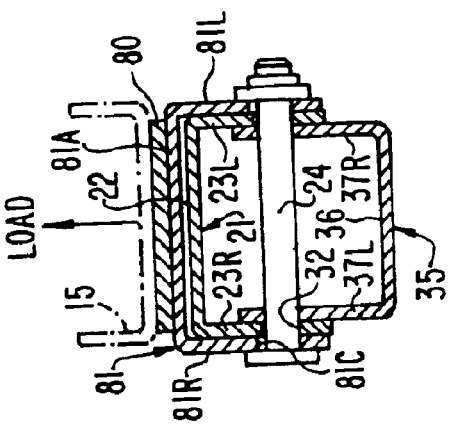
FIG. 8(D) is a sectional view taken along a line VIIID—VIIID of FIG. 8(C).

As an excessive load larger than that in the normal state is applied to the vehicle seat 1 due to a vehicle collision or the like, the base frame 21 is raised upwardly by the excessive load. After the lower peripheries of the elongated holes 32 therefore collide with the stopper bolt 24, only the base bracket 81 is further raised upwardly so that the lower peripheries of the through holes 81C collide with the stopper bolt 24 soon as shown in FIGS. 8(C) and 8(D). Accordingly, the excessive load can be sufficiently borne by not only the base side walls 23L, 23R of the base frame 21 as mentioned above but also by the side walls 81L, 81R of the base bracket 81. Portions below the lower peripheries of the through holes 81C comprise a load bearing portion 81E. In this manner, the bearing of the excessive load is distributed to the base side walls 23L, 23R and the side walls 81L, 81R. Therefore, the load exerted on the base side walls 23L, 23R of the base frame 21 due to an excessive load can be reduced.

Also when the base frame 21 is depressed because of forces applied to the seat belt, the upper peripheries of the through holes 81C collide with the stopper bolt 24 immediately after the upper peripheries of the elongated holes 32 collide with the stopper bolt 24 so as to exhibit the same works. In this case, portions above the upper peripheries of the through holes 81C comprise a load bearing portion 81F.

The aforementioned structure eliminates the necessity of increasing the strength of the load bearing portion (the portions of the base side walls 23L, 23R above and below the holes 32) in the base side walls 23L, 23R of the base frame 21. As a result, this can eliminate the necessity of increasing the thickness at the position of the base side walls 23L, 23R where the holes 32 are formed and increasing the dimension from the holes 32 to the lower ends of the base side walls 23L, 23R.

Therefore, the base frame 21 can be configured compactly, thereby reducing the limitation on layout and increasing the degree of freedom of installation. In addition, since an excessive load as mentioned above is borne by the base bracket 81 made from a band-like plate, the secure bearing of such an excessive load is achieved with simple structure.

Since the stopper bolt 24 and the pivot bolt 25 are of type to be fastened by the nuts 24N and 25N, these are easily and securely attached.

The small apertures 31 formed adjacent to the pivot holes 33 are service windows for observation of the assembling state.

As shown in FIGS. 2, 3(A), and 3(B), the Z arm 61Rr is arranged inside the base frame 21 at the mounting portion 30 at the rear end side of the base frame 21. The Z arm 61Rr has a portion on the front side from the middle portion, which is forked into two plate-shape branches 66 (as shown in FIG. 3(A)). The Z arm 61Rr has a portion on the rear side, where arm side plates 67L, 67R are formed to stand upwardly from the left and right edges. As shown in FIGS. 3(A), 3(B), 7(A), and 7(B), the Z arm 61Rr is assembled between the base side walls 23L and 23R to extend along the inner surfaces of the base side walls 23L and 23R. There are gaps between the arm side plate 67L and the base side wall 23L and between the arm side plate 67R and the base side wall 23R so that flanges of sleeves 70 (71, 72) and 75 are disposed in these gaps.

As shown in FIG. 2, each of the side plates 67L, 67R of the Z arm 61Rr is provided with holes 62, 63 formed at locations corresponding to the elongate hole 32 and the pivot hole 33 of the base side wall 23L, 23R. As shown in FIGS. 2, 3(A), 3(B), 7(A), and 7(B), inserted into the holes 62 (corresponding to the elongate holes 32 of the base frame 21) formed near the rear end of the Z arm 61Rr is the stopper bolt 24. Inserted into the holes 63 (corresponding to the pivot holes 33 of the base frame 21) at the middle portion side of the Z arm 61Rr is the pivot bolt 25.

It is clear from the above that the main task of the stopper bolt 24 is connecting the rear mounting bracket 35 and the Z arm 61Rr in such a manner as to allow the pivotal movement of them and transmitting a seat load to the Z arm 61Rr as can be seen in FIG. 3(B). Since there are gaps between the stopper bolt 24 and the elongated holes 32, the base frame 21 and the stopper bolt 24 are normally prevented from interfering each other. On the other hand, the main task of the pivot bolt 25 is pivotally supporting the Z arm 61Rr relative to the base frame 21, whereby the Z arm 61Rr can pivot about the pivot bolt 25.

Figure 5A:
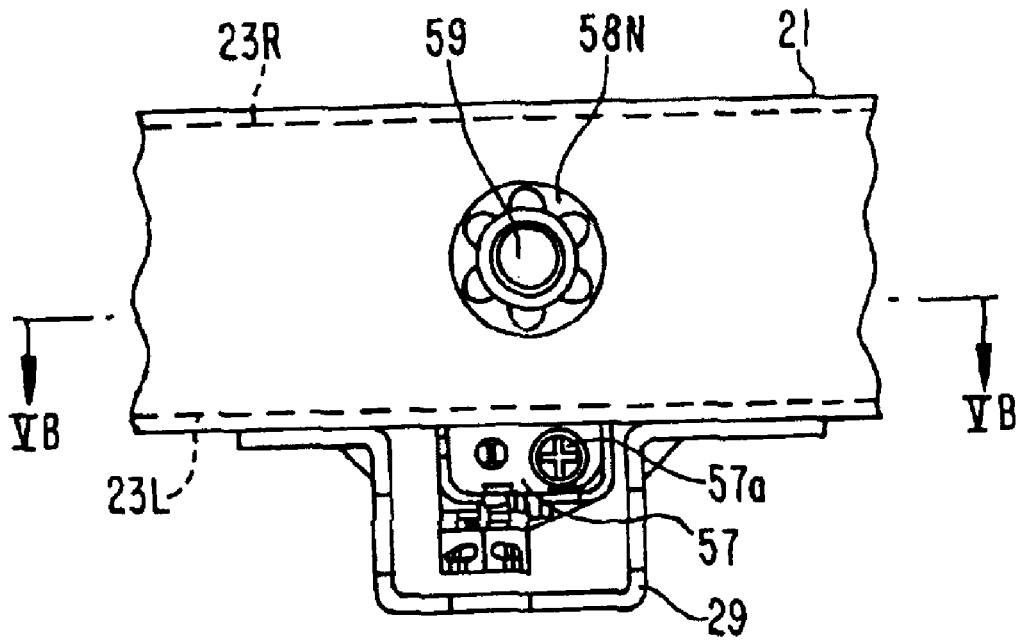
FIG. 5(A) is an enlarged partial plan view of a portion about the sensor portion in the seat load measuring apparatus of FIG. 2.
Figure 5B:
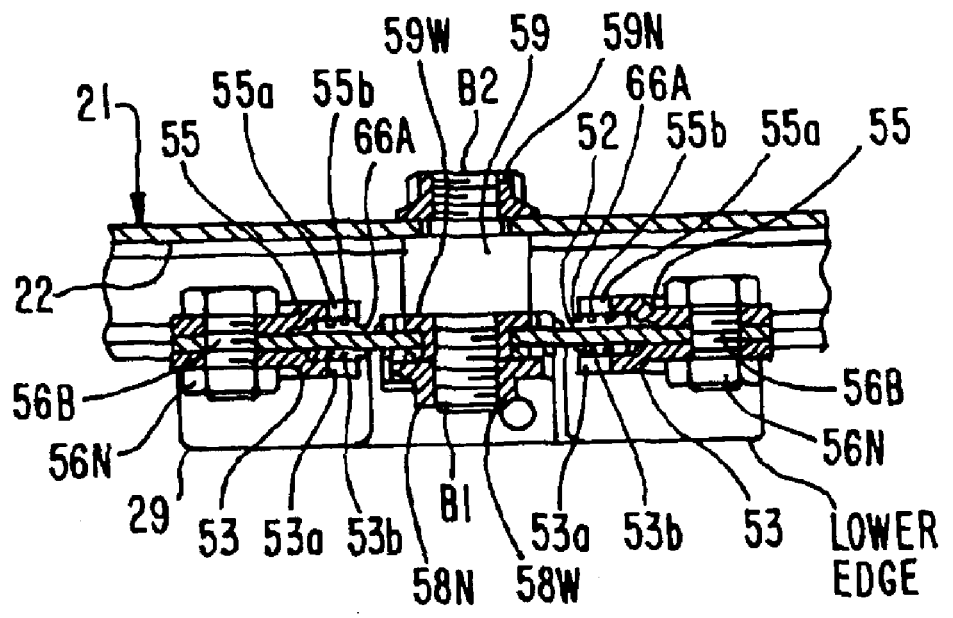
FIG. 5(B) is a sectional view taken along a line VB—VB of FIG. 5(A).

The branches 66 of the Z arm 61Rr are designed to have smaller distance therebetween at the middle portion side. As shown in FIGS. 2, 3(A), and 3(B), a ridge portion 61a is formed in the middle portion of the Z arm 61Rr, thereby increasing the strength of the Z arm 61Rr. Action portions at the ends (rear ends) of the branches 66 are covered by resin arm caps 66A. The resin arm caps 66A are sandwiched between wings 55a, 53a of upper and lower half arms 55, 53 (as shown in FIG. 5(B)) of the load sensor 51 (as will be described later). Because of the arm caps 66A, noises generated when the action end portions of the Z arm 61Rr collide with the wings 53a, 55a of the half arms 53, 55 can be nearly completely absorbed, thereby preventing the occupants sitting on the vehicle seat 1 from hearing jarring sounds.

As a load is exerted on the base frame 21, the Z arm 61Rr slightly pivots, whereby the action end portions transmit the load to the sensor plate 52 through the half arms 53, 55.

As shown in FIGS. 7(A), 8(A), and 8(B), the stopper bolt 24 is inserted through the holes 38, the holes 32, and the holes 81C when the rear rail mounting member 80 fixed to the lower rail 15, the base bracket 81, connected to the base frame 21, and the rear mounting bracket 35 are assembled. In this case, double sleeves 70 (71, 72) are interposed between the outer peripheries of cylindrical portions of the stopper bolt 24 and the inner peripheries of the holes 38 of the rear mounting bracket 35. It should be noted that the double sleeves 70 are not shown in FIGS. 8(A) and 8(B).

Figure 9:
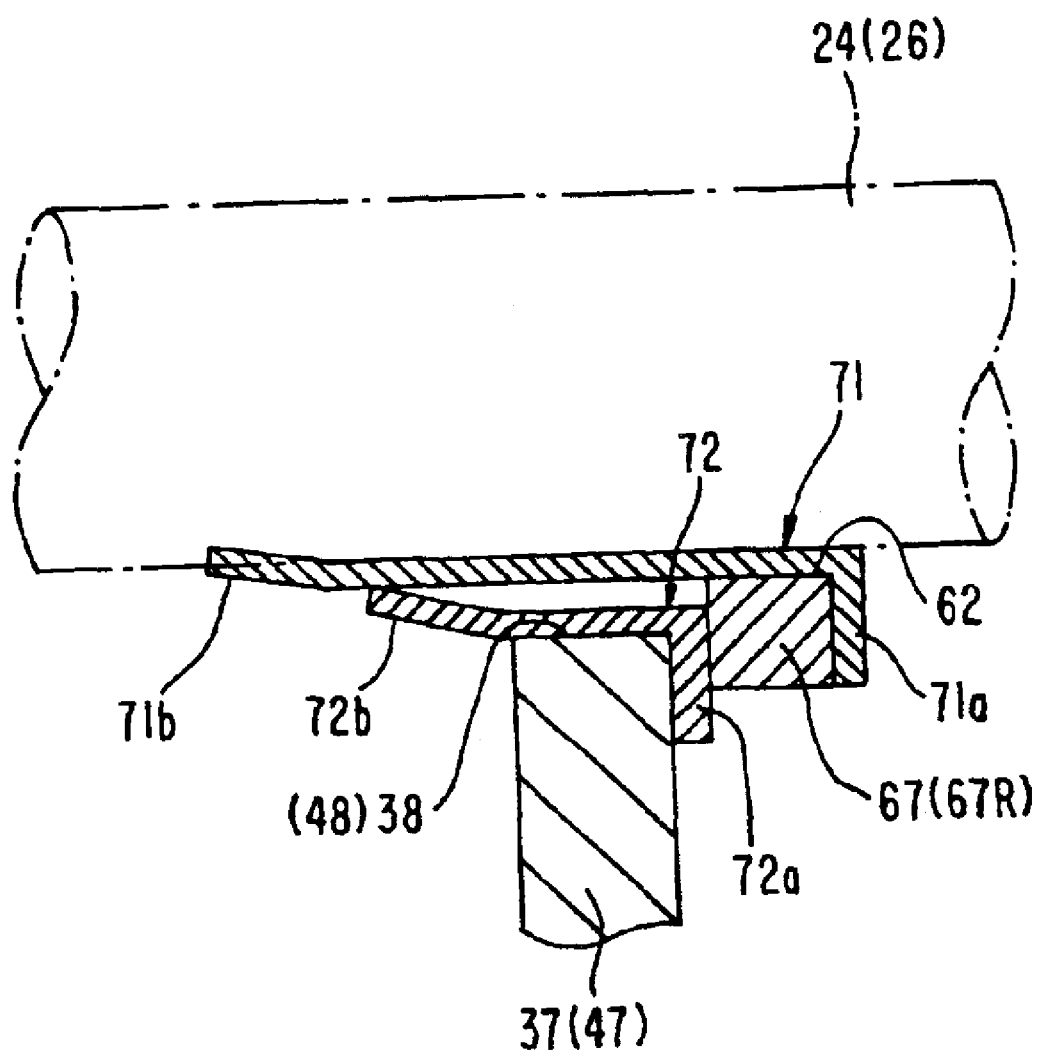
FIG. 9 is an enlarged sectional view showing a portion near a double sleeve of the seat load measuring apparatus of FIG. 2.
Figure 10A:
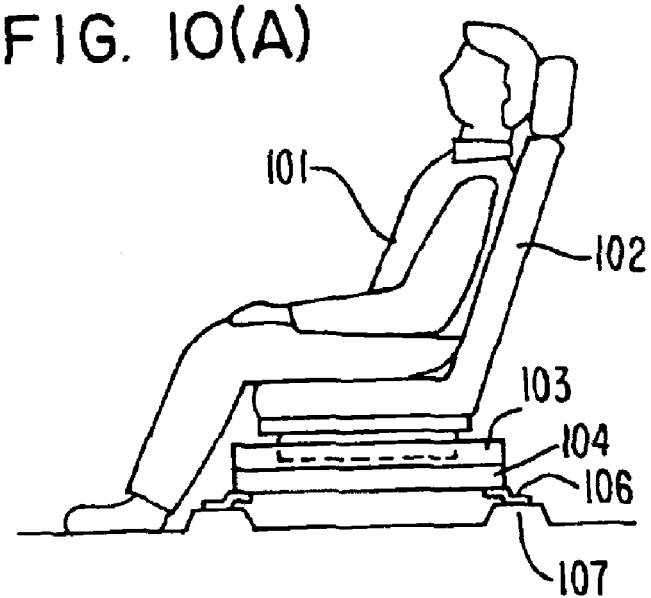
FIG. 10(A) is a side view of a vehicle seat including a seat load measuring apparatus as disclosed in Japanese Patent Unexamined Publication No. 2000-258234 as a conventional example showing a state where an occupant is seated on the vehicle seat.
Figure 10B:
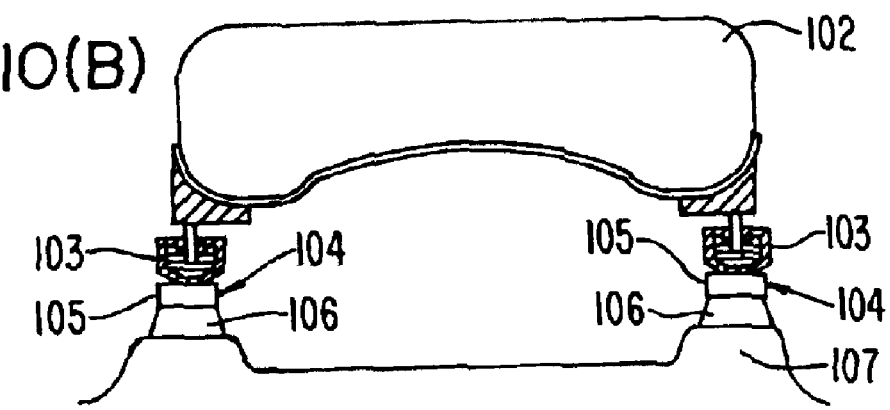
FIG. 10(B) is a sectional view showing the mounting state of the seat load measuring apparatus of FIG. 10(a).
Figure 10C:
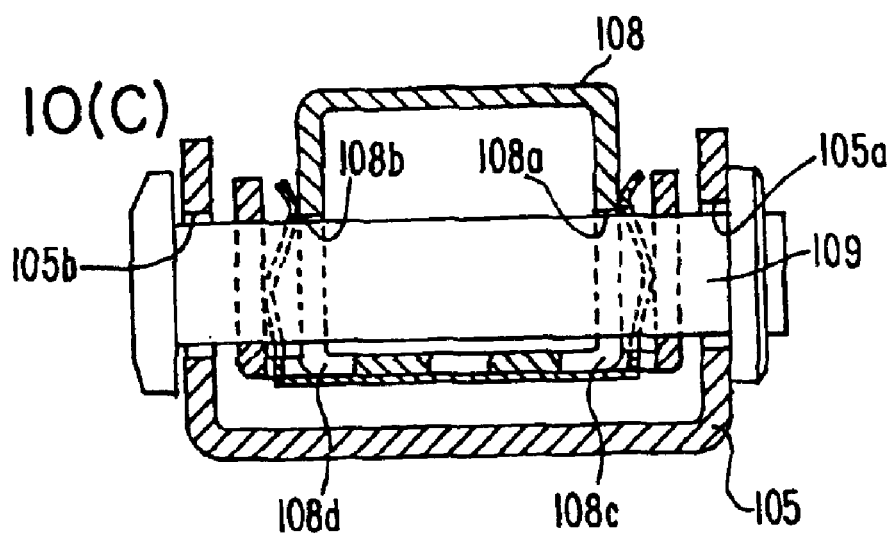
FIG. 10(C) is a sectional view showing details of the mounting structure of the seat load measuring apparatus of FIG. 10(a).

That is, the double sleeves 70 are fitted around the cylindrical portions of the stopper bolt 24 as shown in FIGS. 7(A) and 9. Each of the double sleeves 70 comprises an inner sleeve 71 which is longer, and an outer sleeve 72 which is shorter and fitted around the inner sleeve 71. The sleeves 71, 72 have flanges 71a, 72a at one end and tapered portions 71b, 72b (shown in FIG. 9) at the other end. The inner surfaces of the sleeves 71, 72 and the end faces of the flanges 71a, 72a are coated with, for example, Teflon®. It should be noted that FIG. 9 shows the inclinations of the tapered portions 71b, 72b in an exaggerated way.

The inner sleeve 71 of the double sleeve 70 is fitted into a space between the shaft portion of the stopper bolt 24 and the hole 62 of the arm side plate 67L, 67R and a space between the shaft portion of the stopper bolt 24 and the hole 38 of the rear mounting bracket 35. The outer sleeve 72 is press fitted between the outer periphery of the inner sleeve 71 and the hole 38 of the rear mounting bracket 35. The flange 72a of the outer sleeve 72 is disposed between the arm side plate 67L, 67R and the trapezoidal side plate 37L, 37R (designated by a numeral 37 only in FIG. 9) of the rear mounting bracket 35. The flange 71a of the inner sleeve 71 abuts on the outer surface of the arm side plate 67L, 67R.

The relation between the double sleeve 70 and the peripheral components and the works of the double sleeve 70 are described with reference to FIG. 9.

Since the outer periphery of the inner sleeve 71 is press fitted into the hole 62 of the arm side plate 67L, 67R, the inner sleeve 71 is prevented from rattling within the hole 62. Between the inner sleeve 71 and the stopper bolt 24 inserted through the inner bore of the inner sleeve 71, the tapered portion 71b of the inner sleeve 71 is elastically in contact with and supports the outer periphery of the stopper bolt 24. Therefore, while there is a clearance between a portion of the inner sleeve 71 other than the tapered portion 71b and the stopper bolt 24, the stopper bolt 24 is prevented from rattling within the inner bore of the inner sleeve 71.

Between the outer sleeve 72 and the inner sleeve 71 fitted in the inner bore of the outer sleeve 72, the tapered portion 72b of the outer sleeve 72 is elastically in contact with and supports the outer periphery of the inner sleeve 71. Therefore, while there is a clearance between a portion of the outer sleeve 72 other than the tapered portion 72b and the inner sleeve 71, the inner sleeve 71 is prevented from ratting within the inner bore of the outer sleeve 72.

Accordingly, there is no clearance allowing the ratting of the components between the side plate 37L, 37R of the rear mounting bracket 35 and the stopper bolt 24, thereby preventing the occurrence of noise generated due to the rattling of these components when the load applied to the vehicle seat 1 is varied. It should be noted that the double sleeve 70 is optional and may be omitted when little rattling may occur.

The peripheral components of the pivot bolt 25 as the pivot for the Z arm 61Rr and the rear mounting bracket 35 are described below.

As shown in FIG. 7(B), sleeves 75 are fitted around the outer periphery of the cylindrical portion of the pivot bolt 25. Each sleeve 75 has a flange 75a at one end and a tapered portion 75b at the other end. The inner surface of the sleeve 75 and the end face of the flange 75a are coated with, for example, Teflon®.

Since the sleeve 75 is press fitted into the hole 63 of the arm side plate 67L, 67R, the sleeve 75 is prevented from rattling within the hole 63. Between the sleeve 75 and the pivot bolt 25 fitted in the inner bore of the sleeve 75, the tapered portion 75b of the sleeve 75 is elastically in contact with and supports the outer periphery of the pivot bolt 25. Therefore, while there is a clearance between a portion of the sleeve 75 other than the tapered portion 75b and the pivot bolt 25, the stopper bolt 25 is prevented from rattling within the inner bore of the sleeve 75. Accordingly, the occurrence of noise generated due to the rattling of the pivot bolt 25 and/or the Z arm 61Rr when the load applied to the seat is varied can be prevented.

A Z arm 61Fr to be arranged inside the front side portion of the base frame 21 has the same structure as the aforementioned Z arm 61Rr arranged in the rear side portion of the base frame 21 and comprises branches 66, arm side plates 67L, 67R, and arm caps 66A of action portions at the ends thereof. As shown in FIGS. 2, 3(A), and 3(B), the Z arm 61Rr at the rear end side of the base frame and the Z arm 61Fr at the front end side of the base frame are arranged symmetrically about the center of the base.

Figure 6A:
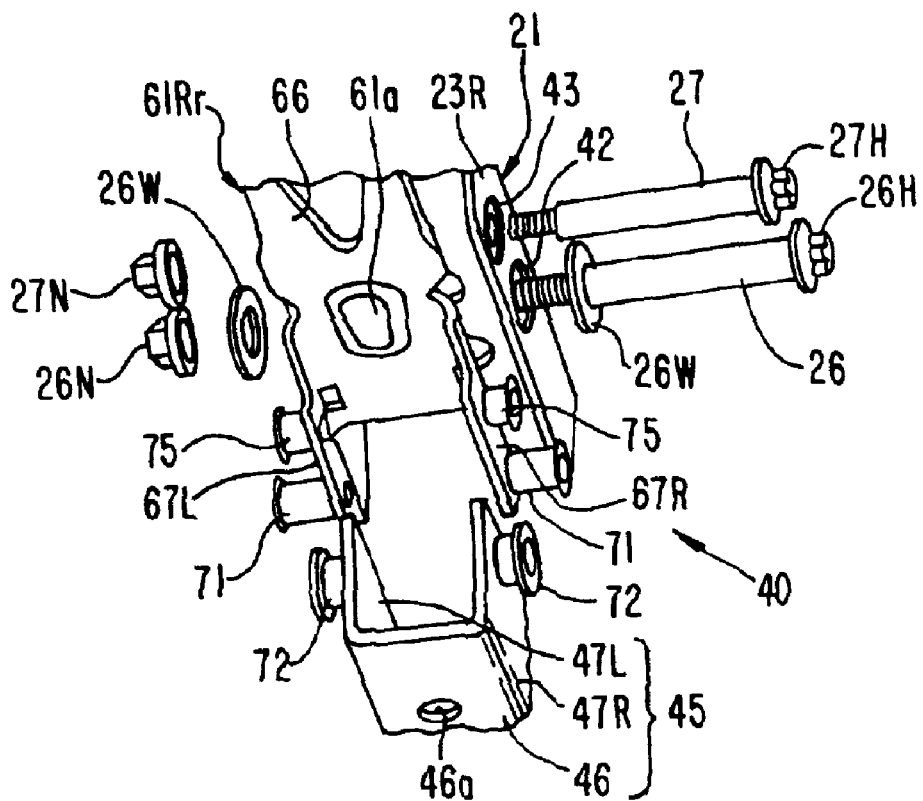
FIG. 6(A) is an exploded view of a rear end portion of the seat load measuring apparatus of FIG. 2.
Figure 6B:
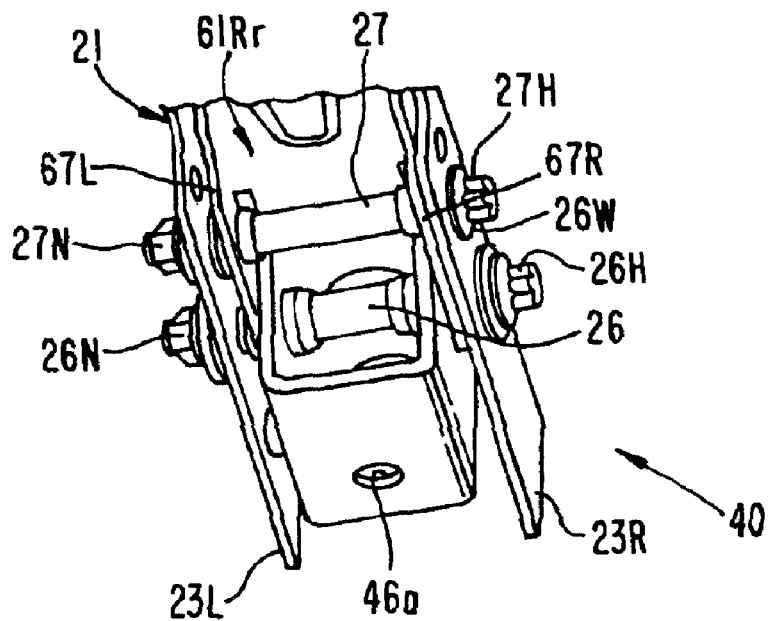
FIG. 6(B) is an assembled view of the rear end portion of FIG. 6(A).

The front mounting bracket 45 is arranged between the arm side walls 67L, 67R of the Z arm 61Fr. As shown in FIGS. 2, 6(A), and 6(B), the front mounting bracket 45 is composed of a flat bottom 46 and side walls 47L, 47R standing from the left and right edges of the bottom 46 in such a manner as to have a U-like cross section. The lower surface of the bottom 46 is fixed to the vehicle floor 7. In this case, the bottom 46 has holes 46a formed therein through which bolts (not shown) (the same as mounting bolts 91, 92 as will be described later of the rear mounting bracket 35 shown in FIGS. 8(A) and 8(B)) are inserted. These bolts are inserted through the holes and threaded into the vehicle floor 7, thereby fixing the front mounting bracket 45 to the vehicle floor 7. In the same manner, as shown in FIG. 8(A), the bolts 91, 92 are inserted through two holes 36a of the rear mounting bracket 35 and threaded into the vehicle floor 7, thereby fixing the rear mounting bracket 35 to the vehicle floor 7.

Each of the side walls 47L, 47R of the front mounting bracket 45 is substantially formed in a trapezoidal shape.

The left and right side walls 47L, 47R have holes 48 at locations corresponding to the elongate holes 42 of the base side walls 23L, 23R. As shown in FIGS. 2, 3(A), 3(B), and 7(A), the stopper bolt 26 is inserted through the holes 48 (corresponding to the elongate holes 42 and the holes 62 of the Z arm 61Fr). As shown in FIGS. 7(A) and 9, double sleeves 70 are inserted through spaces between the holes 48 of the front mounting bracket 45 and the stopper bolt 26 of the Z arm 61Fr similarly to the case of the rear mounting bracket 35. In this case, the stopper bolt 26 is loosely fitted to the elongate holes 42 of the base frame 21.

Further, also at the front end side of the base frame 21, a pivot bolt (pivot pin) 27 is inserted into the holes 43, 44 of the both side walls 23L, 23R as shown in FIG. 7(B). Since the method of mounting the pivot bolt (pivot pin) 27 is the same as that for the pivot bolt 25, the description about the method of mounting the pivot bolt 27 will be omitted.

The sensor portion 50 of the base frame 21 is described below.

As shown in FIG. 2, each of the left and right base-side walls 23L, 23R is formed with a notch 23X at the middle in the longitudinal direction of the base frame 21. A protector 29 which overhangs leftwards is fixed to the outer surface of the left base side wall 23L. A load sensor 51 is fitted in the notches 23X of the base frame 21 and the protector 29, whereby the load sensor 51 is protected by the protector 29.

As shown in FIG. 5(B), in a state that the sensor plate 52, the connector casing 57a, and the protector 29 are assembled in the base frame 21, the level of the lower edge of the protector 29 is lower than any of the level of the lower surface of the sensor plate 52, the level of the lower surface of the connector casing 57a, and the level of the lower surface of the sensor-side connector 57. The level of the upper edge of the protector 29 is higher than any of the level of the upper surface of the sensor plate 52, the level of the upper surface of the connector casing 57a, and the level of the upper surface of the sensor-side connector 57. According to this embodiment, the protector 29 can securely protect precision components such as the sensor plate 52 and the connector 57 of the seat load measuring apparatus 10 even if the base frame 21 in which the seat load measuring apparatus 10 and the protector 29 are assembled is dropped when the base frame 21 is mounted to a vehicle or during transportation.

Since the upper side of the protector 29 is open, a cover (not shown) is preferably provided to cover the upper side of the protector 29 in order to further ensure the protection of the precision components. The lower side of the protector 29 is also open. However, since the foreign matters are easily removed from the inside of the protector 29 even if foreign matters enter into the protector 29, there is no necessity to cover the lower side of the protector 29.

As shown in FIG. 4, the sensor plate 52 is the main component of the load sensor 51 and is a spring member. The sensor plate 52 is composed of a rectangular plate having two necks 52c as a whole. At the left end of the central portion of the sensor plate 52, the sensor-side connector 57 is fixed by a screw 57a (shown in FIG. 5(A)). Connected to the sensor-side connector 57 is an end of a cable from an electronic control unit (ECU) (not shown).

On the sensor plate 52, an insulating layer for electrical insulating, a wiring layer, and a resistive layer are formed. On the sensor plate 52, as shown in FIG. 4, four strain resistors 84, 85, 86, 87 are formed in the film forming method, as strain gauges which cooperate together to compose the load sensor 51. The four strain resistors 84, 85, 86, 87 are connected to each other to form a conventionally known bridge circuit which is connected to the connector 57 but is not shown.

As a seat load is exerted on the sensor plate 52, distortion corresponding to the seat load is caused on the sensor plate 52 so that the resistance values of the four strain resistors 84, 85, 86, 87 vary. The variations in the strain resistance value are detected, outputting a detection signal. The detection signal is transmitted to the ECU. The ECU calculates the distortion of the sensor plate 52, that is, the seat load on the basis of the detection signal of the distortion. It should be noted that, instead of the detection of distortion of the sensor plate 52 by the strain resistors, the load may be obtained from deflection of the sensor plate 52 detected by other elements such as electrical capacitance pressure sensors or Hall elements.

The structure of mounting the sensor plate 52 to the base bottom 22 is described below.

As shown in FIG. 5(B), a center post 59 is fixed to the base bottom 22 at the middle in the longitudinal direction of the base bottom 22. The center post 59 is a substantially cylindrical member having bolts B2, B1 projecting upwardly and downwardly. The upper bolt B2 of the center post 59 penetrates the base bottom 22 and is screwed into a center nut 59N. The lower bolt B1 of the center post 59 penetrates a central hole 52e (shown in FIG. 4) of the sensor plate 52 via a center washer 59W and is fixed by the center nut 58N. The center of the sensor plate 52 is solidly fixed to the base bottom 22 of the base frame 21 through the center post 59.

The structure of the load sensor 51 is described below.

Attached to the both front and rear ends of the sensor plate 52 are half arms 53, 55. The half arms 53, 55 are two pairs to be arranged at front and rear ends of the sensor plate 52, respectively. As for each pair, the half arms 55, 53 are arranged above and below the sensor plate 52 to clamp the sensor plate 52 as shown in FIGS. 4 and 5(B). Since the half arms 55, 53 have same configuration, a description is made with respect only to the half arm 55 arranged above the sensor plate 52.

As shown in FIG. 4, the half arm 55 is a plate member of a rectangular shape and is provided with a mounting hole 55e formed in the center of the base thereof. The half arm 55 has wings 55a which project in the rightward and leftward directions from edges thereof near the center. Levee-like supports 55b are formed on the backs of the wings 55a to extend in the rightward and leftward directions. The top of each support 55b is slightly edged.

The assembly structure of the upper and lower half arms 55, 53, the sensor plate 52, and the action portions (arm caps 66A) of the Z arm 61 is described below.

As shown in FIG. 5(B), the bases of the upper half arm 55 and the lower half arm 53 fully abut on the surfaces of the sensor plate 52 and are fixed by bolts 56B and nuts 56N. The wings 55a, 53a of the upper and lower half arms 55, 53 are arranged in such a manner that the supports 55b, 53b confront each other. Sandwiched between the supports 53b, 55b are the arm caps 66A of the Z arm action portions. The supports 53b, 55b are arranged at positions corresponding to the positions of the necks 52c of the sensor plate 52.

According to the seat load measuring apparatus 10 of this embodiment, the load on the vehicle seat 1 can be detected by the load sensor 51 supported by the base frame 21. The base frame 21 is arranged such that its open side faces downwardly, thereby preventing foreign matters such as dusts or the like from entering and being deposited in the base frame 21. Especially, since liquid hardly enters into the base frame 21, electrical components of the load sensor 51 inside the base frame 21 can be prevented from getting wet even when an occupant spills the liquid, such as juice. Therefore, the durability of the electrical components is improved and reliability of the load sensor is improved. By this load sensor 51, the high-precision detection of load can be stably provided over a long period of time.

Since no special component is required for protecting the electric components of the load sensor 51 inside the base frame 21 from getting wet with liquid, the increase in number of components can be inhibited and the work for mounting such a special component can be eliminated.

Since the base frame 21 is arranged such that open side faces of the base frame 21 face downwardly, the bottom 22 of the base frame 21 positioned at the upper side is attached to the rear rail mounting member 80 of the lower rail 15, whereby the work of attaching the base frame 21 is conducted from the open side and is therefore easy. Therefore, the necessity of special step of processing the base frame 21 such as forming holes for allowing this attaching work can be eliminated and the decline in strength of the base frame 21 can be prevented. In addition, no cover for closing the lower opening of the base frame 21 is required, thereby reducing the cost and reducing the weight.

When a load is applied to the seat rail 8 in the normal state, the load can be borne by the base frame 21 because the load is relatively small. On the other hand, when a relatively large load is applied to the seat rail 8 during a vehicle collision or the like, the large load is borne by the load bearing portions 81E, 81F of the base bracket 81.

In this manner, since even large load generated during a vehicle collision or the like can be borne by the load bearing portions 81E, 81F of the base bracket 81, the load exerted on the base frame 21 is distributed and thus reduced, whereby the load on the base frame 21 becomes relatively small. Therefore, the necessity of increasing the strength of the base frame 21 can be eliminated and, as a result, the necessity of increasing the dimensions of the base frame 21 can be eliminated. Therefore, the base frame 21 can be configured compactly, thereby reducing the limitation on layout and increasing the degree of freedom of installation.

In addition, since the base bracket 81 is made from a band-like plate, the secure bearing of such an excessive load is achieved with simple structure.

The actions of the upper and lower half arms 55, 53, the sensor plate 52, and the Z arm 61 when load is applied to the seat load measuring apparatus 10 are described in detail, for example, in the aforementioned Japanese Patent Unexamined Publication No. 2000-258234 and should be understood by reading the Patent Japanese Patent Unexamined Publication No. 2000-258234, so the description will be omitted here. The load applied to the seat load measuring apparatus 10 is obtained by the computation of the ECU on the basis of the measured distortion of the sensor plate 52.

In the present invention, the rear rail mounting member 80 is optional and may be omitted. In this case, the side frame 3 is directly attached to the base bracket 81 of the base frame 21. However, it is preferable to provide the rear rail mounting member 80 in order to easily and securely connect the side frame 3 and the base frame 21.

Though the base brake 21 is formed to have a U-like cross section in the aforementioned embodiments, the base of the present invention is not limited to that having a U-like cross section and may be formed in any configuration, such as an L-like shape, having a bottom at its upper side and an opening at its lower side and capable of protecting a sensor inside thereof.

As apparent from the aforementioned description, in a seat load measuring apparatus according to embodiments of the present invention, a load applied to a vehicle seat can be detected by a load sensor supported by a base. The base is arranged such that an open side of the base faces downwardly, thereby preventing foreign matters such as dusts or the like from entering and being deposited in the base. Especially, since liquid hardly enters into the base, electrical components of the load sensor inside the base can be prevented from getting wet even when an occupant spills the liquid such as juice. Therefore, the durability of the electrical components is improved and reliability of the load sensor is improved. By this load sensor, the high-precision detection of load can be stably provided over a long period of time.

Since no special component is required for protecting the electric components of the load sensor inside the base from getting wet with liquid, the increase in number of components can be inhibited and the work for mounting such a special component can be eliminated.

Since the base is arranged such that the open side of the base faces downwardly, the bottom of the base positioned at the upper side is attached to the rail mounting member of the seat rail, whereby the work of attaching the base is conducted from the open side and is therefore easy. Therefore, the necessity of a special step of processing the base, such as forming holes for allowing this attaching work, can be eliminated and the decline in strength of the base can be prevented. In addition, no cover for closing the lower opening of the base is required, thereby reducing the cost and reducing the weight.

When a load is applied to the seat rail in the normal state, the load can be borne by the base because the load is relatively small. On the other hand, when a relatively large load is applied to the seat rail during a vehicle collision or the like, the large load is borne by the load bearing portions of the base bracket.

In this manner, since even large load generated during a vehicle collision or the like can be borne by the load bearing portions of the base bracket, the load exerted on the base is distributed and thus reduced, whereby the load on the base frame 21 becomes relatively small. Thus, the necessity of increasing the strength of the base can be eliminated, and, as a result, the necessity of increasing the dimensions of the base can be eliminated. Therefore, the base can be configured compactly, thereby reducing the limitation on layout and increasing the degree of freedom of installation.

In addition, since the base bracket is made from a band-like plate, the secure bearing of such an excessive load is achieved with simple structure.

According to an embodiment of the present invention, the seat rail can be provided with a an integral rail mounting member, and the base bracket can connected to the seat rail via the rail mounting member, thereby facilitating the work of attaching the base to the seat rail.

The priority application, Japanese Patent Application No. 2003-113991, filed on Apr. 18, 2003, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat load measuring apparatus for measuring a load of a vehicle seat, comprising:
- a base for bearing the load applied to the vehicle seat;
- an arm supported by the base for receiving the load applied to the vehicle seat;
- a load sensor supported by the arm for detecting the load applied to the vehicle seat; and
- a seat rail for guiding the vehicle seat slidably in a longitudinal direction of the vehicle,
- wherein the base is fixed to a lower side of the seat rail and is arranged so that an open face of the base faces in a downward direction;
- wherein the arm is connected by a stopper pin inserted through holes formed in the base to a mounting bracket fixed to a vehicle body;
- wherein a base bracket including a load bearing portion is attached to the base and is fixed to the lower side of the seat rail; and
- wherein the load bearing portion is configured to contact the stopper pin when a load exceeding a predetermined value is applied to the seat rail so that the load exceeding a predetermined value is borne by the load bearing portion.

2. The seat load measuring apparatus of claim 1, wherein the seat rail includes a rail mounting member connected to the base bracket.

3. The seat load measuring apparatus of claim 2, wherein the seat rail and the rail mounting member are integral.

4. A seat load measuring apparatus, comprising:
- a seat rail;
- a base fixed to the seat rail;
- an arm configured to transmit load from the base to a load sensor;
- a base bracket;
- a mounting bracket fixed to a vehicle body; and
- a stopper pin,
- wherein the base is formed in an inverted substantially U-shape,
- wherein the base, the arm, the base bracket, and the mounting bracket are interconnected by the stopper pin, and
- wherein the base bracket is configured to contact the stopper pin only when a load applied to the seat rail exceeds a predetermined value.

* * * * *